United States Patent
Lopes

(10) Patent No.: US 8,095,170 B2
(45) Date of Patent: Jan. 10, 2012

(54) BASE STATION AND A METHOD OF OPERATION THEREFOR

(75) Inventor: Luis Lopes, Swindon (GB)

(73) Assignee: Motorola Mobility, Inc., Libertyville, IL (US)

( * ) Notice: Subject to any disclaimer, the term of this patent is extended or adjusted under 35 U.S.C. 154(b) by 142 days.

(21) Appl. No.: 12/678,349

(22) PCT Filed: Oct. 13, 2008

(86) PCT No.: PCT/US2008/079698
§ 371 (c)(1), (2), (4) Date: Mar. 16, 2010

(87) PCT Pub. No.: WO2009/061585
PCT Pub. Date: May 14, 2009

(65) Prior Publication Data
US 2010/0197306 A1     Aug. 5, 2010

(30) Foreign Application Priority Data

Nov. 5, 2007 (GB) .................................. 0721685.6

(51) Int. Cl.
*H04B 7/00* (2006.01)
(52) U.S. Cl. ..................................... 455/522; 455/435.2
(58) Field of Classification Search .................. 455/410, 455/411, 414.1, 403, 435.1, 435.2, 436–439, 455/522; 370/331, 332
See application file for complete search history.

(56) References Cited

U.S. PATENT DOCUMENTS

| 6,764,898 B1 | 7/2004 | Bloch |
| 2003/0176190 A1 | 9/2003 | Mohebbi et al. |
| 2010/0216426 A1* | 8/2010 | Karim et al. ................. 455/410 |
| 2010/0260139 A1* | 10/2010 | Backstrom et al. ........... 370/331 |

FOREIGN PATENT DOCUMENTS

| GB | 2390953 A | 1/2004 |
| KR | 1020060012717 A1 | 2/2006 |
| WO | 9637083 | 11/1996 |

* cited by examiner

Primary Examiner — Cong Tran

(57) ABSTRACT

A base station (103) for a cellular communication system comprises a user equipment store (205) which provides a user equipment subset which identifies at least one user equipment (107) associated with the base station. An access processor (203) restricts access to the base station (103) to the user equipments (107) that belong to the user equipment subset. A path loss processor (209) determines a path loss estimate indication from at least one neighboring base station (101) to a cell supported by the base station (103). A parameter controller sets an operating parameter for the cell (105) in response to the path loss estimate indication. The invention may allow facilitated or improved introduction and/or configuration of restricted base stations supporting only specific user equipments. In many scenarios, a restricted base station may be configured depending on a path loss estimate such that improved performance may be achieved without any frequency planning for the base station.

9 Claims, 8 Drawing Sheets

BASE STATION AND A METHOD OF OPERATION THEREFOR

FIELD OF THE INVENTION

The invention relates to a base station and a method of operation therefor and in particular, but not exclusively, to a base station for a Universal Mobile Telecommunication System.

BACKGROUND OF THE INVENTION

A method which has been used to increase the capacity of cellular communication systems is the concept of hierarchical cells wherein a macro-cell layer is underlayed by a layer of typically smaller cells having coverage areas within the coverage area of the macro-cell. In this way, smaller cells, known as micro-cells or pico-cells (or even femto-cells), are located within larger macro-cells. The micro-cells and pico-cells have much smaller coverage thereby allowing a much closer reuse of resources. Frequently, the macro-cells are used to provide coverage over a large area, and micro-cells and pico-cells are used to provide additional capacity in e.g. densely populated areas and hotspots. Furthermore, pico-cells can also be used to provide coverage in specific locations such as within a residential home or office.

The current trend is towards introducing a large number of pico-cells to 3G systems. For example, it is envisaged that residential access points may be deployed having a target coverage area of only a single residential dwelling or house. A widespread introduction of such systems would result in a very large number of small underlay cells within a single macro-cell.

However, underlaying a macro-layer of a 3G network with a pico-cell (or micro-cell) layer creates several issues. For example, the introduction of a large number of underlay cells creates a number of issues related to resource allocation and intercell interference management.

For example, spectrum and frequency planning is typically applied in cellular communication systems to manage resource allocation and interference between cells in order to ensure that different cells can coexist efficiently. However, such an approach is not practical for the introduction of a large number of dynamically allocated residential access points as this would require a very frequent frequency replanning thereby resulting in unacceptable management resource demands and unacceptable disruptions to the cellular communication system. Accordingly, it is desirable that the introduction of a new residential access point can be achieved with no or minimal planning effort and with minimal disruption.

The problem of introducing underlay cells is exacerbated for base stations which are intended to only support specific user equipments. Specifically, residential access points can be private base stations that are configured to support only a small group of specific identified user equipments. For example, a residential access point may have a limited list of user equipments that are subscribed to use the residential access point. E.g., a residential access point in a subscribers house may only be used by members of that subscriber's household.

A problem in such an arrangement is that the residential access point must be able to effectively support the subscribed user equipment within a given coverage area (e.g. the residence) while allowing non-subscribed user equipments to be effectively supported by another cell which specifically may be the macro cell covering the residential access point cell.

However, these requirements tend to be in conflict with each other and typically the introduction of a residential access point will degrade some macro cell performance for non-subscribed user equipments and will require detailed and labour intensive optimisation in order to reduce this degradation and provide an improved trade-off between the residential access point and macro cell performance.

Hence, an improved system would be advantageous and in particular a system allowing increased flexibility, facilitated introduction of new base stations, improved support and/or operation for base stations supporting only a subset of users, reduced interference, reduced requirement for manual configuration of base stations and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a base station for a cellular communication system, the base station comprising: means for providing a user equipment subset identifying at least one user equipment associated with the base station; means for restricting access to the base station to user equipments belonging to the user equipment subset; means for determining a path loss estimate indication from at least one neighbouring base station to a cell supported by the base station; and operating means for setting an operating parameter for the cell in response to the path loss estimate indication.

The invention may allow improved performance and/or facilitated operation in a cellular communication system. The invention may facilitate introduction of a private base stations supporting only a subset of user equipments and may reduce and/or eliminate the need for manual planning and/or configuration of the base station and/or the cellular communication system. The invention may in many embodiments allow improved operation and/or performance for user equipments belonging to the user equipment subset and/or for user equipments not belonging to the user equipment subset. In many scenarios, the invention may improve simultaneous support of both user equipments located in the cell and belonging to the user equipment subset and user equipments located in the cell and not belonging to the user equipment subset.

The access to the base station may in some embodiments be restricted such that only user equipments belonging to the user equipment subset can exchange user data with the base station. The access to the base station may in some embodiments be restricted such that only user equipments belonging to the user equipment subset can register with the base station. E.g. user equipments in idle or active mode are rejected by the base station unless they belong to the user equipment subset.

The user equipment subset may comprise a user equipment identity for each user equipment of the user equipment subset.

The path loss estimate indication may be any indication or measure that is indicative of a path loss estimate for the path loss from the at least one neighbouring base station to the cell supported by the base station. The path loss estimate indication may specifically consist in or include a path loss measure and/or a received signal to noise ratio and/or a received signal level for a signal transmitted from the neighbouring base station and received at the base station.

The means for determining the path loss estimate indication may be arranged to determine a path loss estimate in response to reported measurements of signal levels of a signal transmitted by the at least one neighbouring base station from at least one user equipment in the cell. The path loss estimate may be an averaged path loss estimate for different locations within the cell.

According to another aspect of the invention there is provided a method of operation for a base station of a cellular communication system, the method comprising: providing a user equipment subset identifying at least one user equipment associated with the base station; restricting access to the base station to user equipments belonging to the user equipment subset; determining a path loss estimate indication from at least one neighbouring base station to a cell supported by the base station; and setting an operating parameter for the cell in response to the path loss estimate indication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Code Division Multiple Access (CDMA) cellular communication system and in particular to a UMTS cellular communication system. However, it will be appreciated that the invention is not limited to this application but may be applied to many other cellular communication system.

Figure 1:
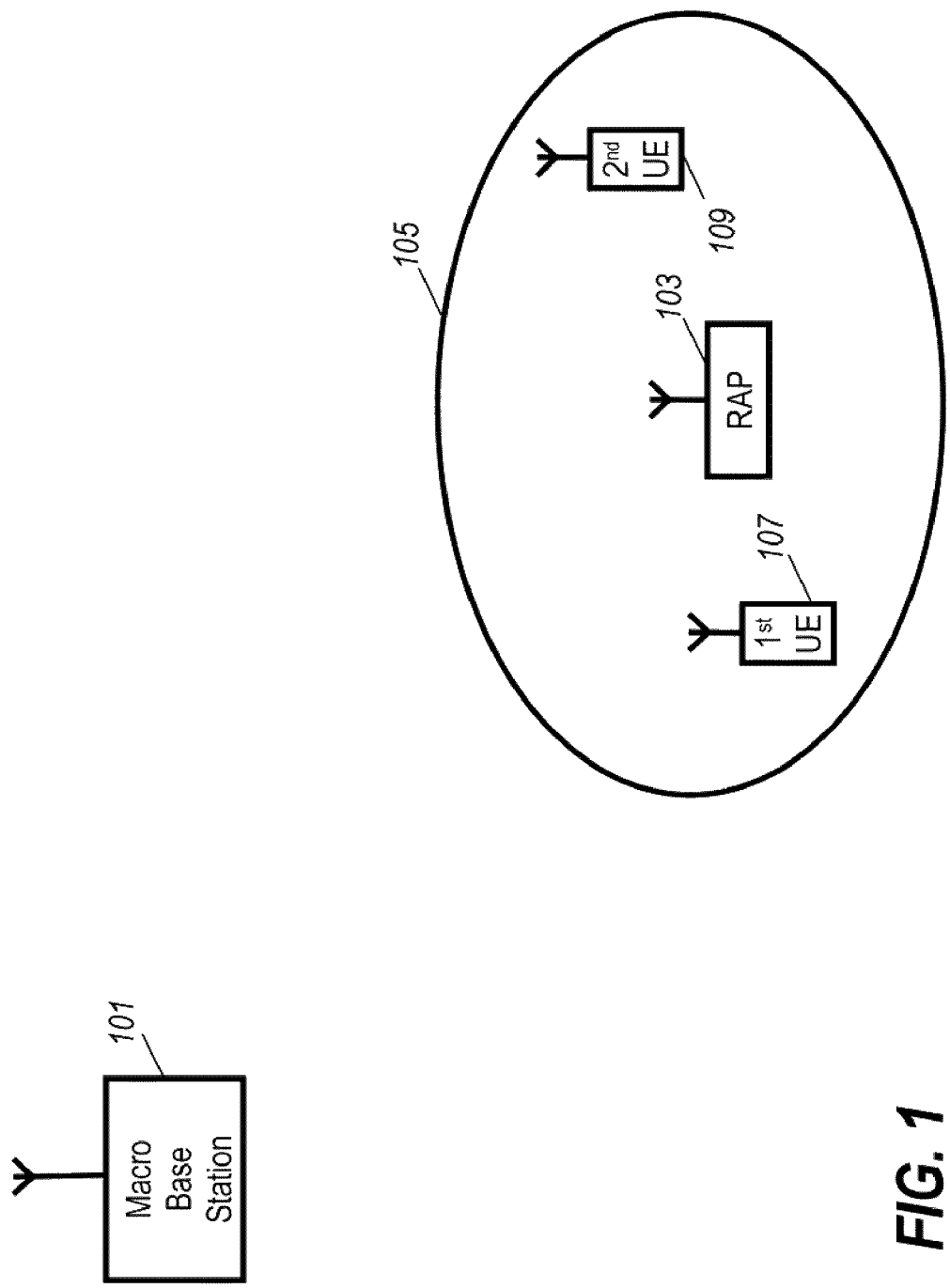
FIG. 1 illustrates elements of a cellular communication system in accordance with some embodiments of the invention.

FIG. 1 illustrates elements of a cellular communication system in accordance with some embodiments of the invention.

FIG. 1 illustrates a macro base station 101 which supports user equipments in a macro cell. The macrocell may be a relatively large cell with a large coverage area. For example the effective range from the macro base station 101 may be ten kilometres or more.

In the system of FIG. 1, a base station 103 supports a cell 105 whose coverage area is entirely within the coverage area of the macrocell. In the specific example, the cell 105 is small relative to the macro cell and specifically the coverage area of the cell 105 is less than a tenth of the coverage area of macro cell.

In the example, the base station 103 is a residential access point which is intended to provide coverage within the residence of a specific subscriber or subscribers. The base station/ residential access point 103 is intended to support only a specific identified group of subscribers within the cell 105 whereas user equipments of other subscribers within the cell 105 are directly supported by the macro base station 101 rather than by the residential access point 103. Thus, whereas the base station 103 is a restricted base station supporting only specific user equipments, the macro base station 101 is an unrestricted base station which may support any user equipment within the macro cell.

The residential access point 103 will henceforth be referred to as a private base station 103 as its services are restricted to a specific identified group of subscribers/user equipments. Similarly, the cell 105 will be referred to as a private cell 105. Thus, a private base station or cell is open only to access for certain users.

The introduction of a private base station 103 in the UMTS cellular communication system of FIG. 1 allows the system to provide a flexible, targeted, diversified and differentiated set of communication services to the subscribers. For example, the private base station 103 may be restricted to provide communication services to the inhabitants of the residence in which the private base station is located. Accordingly, cheap voice calls, high data rate services etc may be provided to the subscribers of the household when at home while the usual mobile communication services are provided when the subscribers are away from the residence. Thus, for the individual subscriber, a single UMTS communication device can provide the communication services which are familiar from both cellular mobile communication systems and fixed landline systems. Also, the use of private base stations 103 allows such services to be provided only to the selected user equipments while ensuring that all visiting user equipments are treated as if the private cell does not exist thereby facilitating operation and management. Thus, the advantage of making a cell private is that the residential access point provides good indoor coverage to the selected user equipments, which typically would be those associated with the residents. At the same time the restriction of the private base station 103 to selected user equipments allows the network operator to control and restrict the application of the services of the base station 103 to specific user equipments subscribing to the specific services, allows increased security and privacy for the user equipments. For example, a residential access point may be used for accessing a number of different personal or private services (such as Internet access) or personal networks which cannot be accessed by other user equipments.

In the example, two user equipments 107, 109 are currently located within the private cell 105. The first user equipment 107 belongs to a subscriber within the household and is registered/subscribed with the private base station 103 such that the first user equipment 107 is a user equipment that may be supported by the private base station 103. In contrast, the second user equipment 109 is a visiting user equipment which is not registered/subscribed with the private base station 103 and therefore is not allowed to use this. Accordingly, the second user equipment 109 is supported by the macro base station 101 and the macrocell that covers the coverage area of the private cell 105.

Private cells preferably use some of the available UMTS spectrum without requiring a dedicated frequency planning. For example, a large number of private base stations may be dynamically introduced to an existing UMTS communication system in an ad-hoc manner making it impractical and unfeasible that a new frequency plan is introduced every time a private base station is installed. In the example, the private cell 105 is not considered in the frequency planning for the system and thus the frequency plan for the specific geographical area that includes the macro cell and the private cell 105 does not include the private base station 103.

In a typical CDMA communication system, there may already be some interference problems due to unplanned frequency reuse but this is made worse if the cells are private systems as two different base stations (the private base station and a macro base station) support the same area.

For example, as the inventor has realized, if the private cell is near the macro base site, the coverage of the private base station may be limited by the interference from downlink transmissions from the macro base station. Also, the user equipments supported by the private base station may cause interference to the macro base station uplink receiver. If the private cell is far from the macro base site, a user equipment within the private cell but supported by the macro base station may interfere with the uplink communication to the private base station. Also, the downlink transmissions from the private base station can cause interference to the user equipments supported by the macro cell thereby creating coverage holes in the macro cell.

These interference effects will be particularly significant when the private base station and the macro base station are co-channel base stations reusing a common (traffic) channel. However, the described effects may also be significant and limiting even if the macro base station and the private base station are using different channels (for example, in adjacent frequency allocations In a CDMA system such as UMTS, co-channel use may occur when the base stations use the same frequency channel even if they have differently allocated base station scrambling codes. Adjacent-channel use may occur when the base stations use adjacent frequency channels even if they have differently allocated base station scrambling codes.

In the system of FIG. 1, the private base station 103 comprises functionality for automatically configuring at least one operating parameter for the private cell depending on an indication of a path loss estimate for the path loss from the macro base station 101 to the private cell 105.

Specifically, the private base station 103 determines an indication of a path loss estimate and based on this it sets parameters such as the transmit power of the broadcast channels transmitted by the private base station; the maximum transmit power for downlink transmissions in traffic channels; the maximum transmit power of the user equipments attached to it; and the effective sensitivity of the uplink receiver of the private base station 103. By doing this, the cell reduces the impact at the receiver of the macro base station 101 and visitor user equipment 109 whilst also reducing possible impacts at the private base station 103 from the macro system. By biasing the solution towards one extreme of the constraint space or the other, the cell may be controlled to give priority to the macro system, to itself or may perform a compromise. Thus, a flexible and automatic configuration may be achieved without requiring dedicated or manual planning or configuration. Thus, the private base station 103 can automatically adapt to the conditions in the location where it is deployed and in particular can adapt its operation depending on the location relative to the macro base station 101 also covering the private cell.

Thus, the operation of the private base station can reduce unwanted macro-private cell interactions without requiring any planning. A very simple set of rules can be derived for setting the parameters. For example, for path loss estimates corresponding to a location near the macro base site, the downlink power can be set higher thereby increasing range against interference whilst uplink power is limited and/or the receiver sensitivity is set relatively high thereby reducing probability of macro base station interference. For path loss estimates corresponding to a location far from the base site, the downlink power can be reduced to reduce probability of macro cell coverage holes in (or near) the private cell and the uplink transmit power can be increased and/or the sensitivity can be degraded to combat interference caused by visiting macro user equipments transmitting at high powers. A more detailed explanation and analysis of possible rules and the reasoning behind applying these will be described later.

Figure 2:
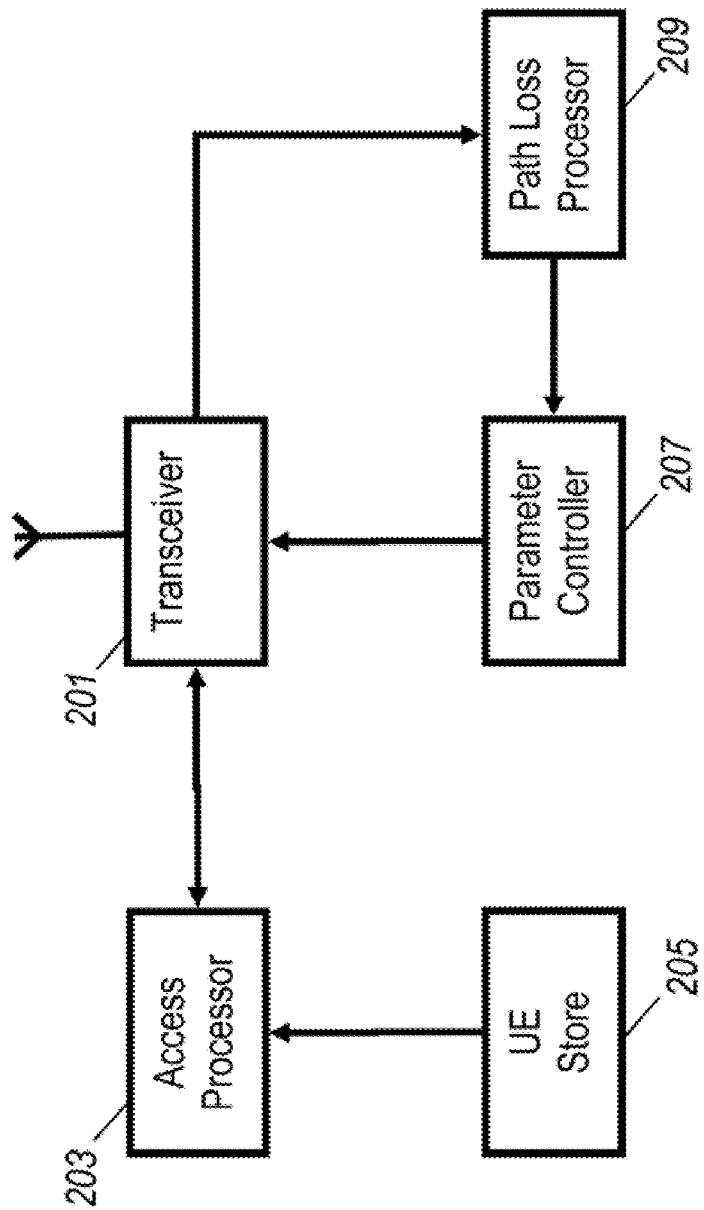
FIG. 2 illustrates elements of a base station in accordance with some embodiments of the invention.

FIG. 2 illustrates the private base station 103 in more detail.

The private base station 103 comprises a transceiver 201 which is capable of communicating with user equipments over the UMTS air interface. The transceiver 201 specifically comprises all the functionality required or desired for supporting user equipments which are registered/subscribed to the private base station 103 i.e. which are contained in the subset of user equipments that are allowed to use the private base station 103.

The transceiver 201 is coupled to an access processor 203 which is further coupled to a user equipment store 205. The user equipment store 205 contains a list of the identity of the user equipments which are registered/subscribed to the private base station 103. In the specific example, the user equipment store 205 comprises the user equipment identity for the user equipments of the household of the residence in which the private base station 103 is installed. Thus, the user equipment store 205 stores a user equipment subset which identifies one or more user equipments associated with the private base station 103. The user equipment subset corresponds to the subset of the user equipments in the UMTS communication system that are allowed to use a private base station 103.

The access processor 203 is arranged to restrict access to the private base station 103 to user equipments that belong to the user equipment subset. Thus, only the user equipments having an identity corresponding to an identity registered at the private base station 103 is allowed to access the base station. Specifically, if an access request is received from a user equipment, the identity of the requesting user equipment is fed to the access processor 203 which in response checks the user equipment store 205 to determine whether this identity is comprised in the user equipment subset. If so, the access processor 203 allows the transceiver to continue with the access procedure. If not, the access processor 203 instructs the transceiver 201 to reject the access request.

It will be appreciated that the access to the private base station 103 may be restricted both for user equipments in idle mode as well as for user equipments in active mode.

The private base station 103 furthermore comprises a path loss processor 209 coupled to the transceiver 201. The path loss processor 209 is arranged to determine an indication of a path loss estimate for the path loss from the macro base station 101 to the private cell. In the specific example an actual path loss estimate is generated but it will be appreciated that in other embodiments, other indications may be used such as a signal to noise ratio or signal level of a signal transmitted from either the macro base station 101 or the private base station 103 and received by the other base station 103, 101.

The generated path loss estimate represents a typical path loss from the macro base station 101 to the private cell. Thus, the path loss estimate is typically not an instantaneous path loss measured for a specific user equipment in the private cell but rather represents an average path loss estimate averaged over time and/or location. Thus, the path loss estimate represents an estimate of the typical, average and/or expected path loss between the macro base station 101 and the private cell as a whole. The path loss estimate may specifically be a time averaged path loss estimate for a path loss from the macro base station 101 to the private base station 103.

Typically the private cell will have a coverage area that is relatively small compared to the distance from the private cell to the base station and accordingly the path loss variations as a function of location within the private cell will be relatively small in comparison to the path loss from the macro base station 101 to the private cell.

In some embodiments, the path loss estimate may be generated from measurements made by user equipments within the private cell. For example, upon installation of the private base station 103 a manual measurement process may be executed with a user being requested to walk around in the private cell 105 with a user equipment reporting measurements of the pilot signal transmitted from the first base station 101. The received measurements may be compared to the transmitted power from the macro base station 101 (e.g. provided to the private base station 101 from a suitable network entity such as an operations and maintenance centre operated by the network operator) and the corresponding path loss may be calculated for the different locations. The measured path loss may then be averaged to generate the path loss estimate.

Alternatively or additionally, during normal operation the user equipments registered/subscribed to the private base station 103 may continuously provide measurement reports of the pilot signal from the macro base station 101. These measurement reports may be compared to the macro station pilot signal transmit power and the corresponding path loss may be calculated. The measurements may be averaged over a relatively long duration to provide a good estimate of the typical path loss from the macro base station 101 to the private base station 103.

Alternatively or additionally, in some embodiments, the private base station 103 may itself be arranged to make measurements of a received signal level for the pilot signal transmitted by the macro base station 101. Thus, the path loss estimate may directly be generated as a time averaged path loss from the macro base station 101 to the private base station 103.

It will be appreciated, that other methods of determining a path loss estimate may be used without detracting from the invention and/or that a plurality of path loss estimation algorithms may be combined. For example, an initial path loss estimate may be generated using a manual measurement procedure with the resulting path loss estimate being continuously updated based on measurement reports from user equipments supported by the private base station 103.

The path loss processor 209 is coupled to a parameter controller 207 which is furthermore coupled to the transceiver 201. The parameter controller 207 is arranged to set an operating parameter for the cell in response to the path loss estimate.

The operating parameter which is set depending on the path loss estimate may be different in different embodiments and the actual rules or criteria used to determine the value of the parameter may depend on the specific requirements and preferences of the individual embodiment.

In some embodiments, the operating parameter may be a downlink transmission parameter of the private base station 103. Specifically, the private base station 103 may set the transmit power for its broadcast common channels depending on the path loss estimate.

In UMTS, several common channels are transmitted at a power level which is independent of the current conditions in the cell. Examples of these are the Common Pilot Channel (CPiCH), which is measured by the user equipments and used to determine whether a handover is appropriate, and the Broadcast Control Channel (BCCH) which carries important broadcast information. Thus, effectively the BCCH (together with other common channels) determines the coverage area of the cell. However, the common channels transmitted in the private cell 105 may prevent user equipments from measuring the CPiCH of the macro base station 101. Accordingly, the private cell common channels may cause coverage holes in the macro cell. This effect is most pronounced if the path loss to the private cell 105 is large and accordingly the transmit power may be set at a lower level if the path loss estimate is high (e.g. above a given threshold) than if the path loss estimate is low (e.g. below a given threshold). Thus, the parameter controller 207 may be arranged to decrease the transmit power of the broadcast common channels for increasing path loss estimates. This reduction in the broadcast channel power may be limited to the situation where the path loss estimate meets a given criterion, such as a requirement that the path loss estimate is within a given interval.

As another example of a downlink transmission parameter that may be set depending on the path loss estimate is a maximum traffic channel transmit power for the private base station 103. The downlink traffic channel transmit power is in UMTS controlled by a power control loop that ensures that the transmitted power is sufficient to achieve a desired performance while not causing unnecessary interference. Similarly to the broadcast control channel transmissions, the downlink traffic channel transmissions can result in interference to the macro user equipments 109 thereby preventing these from reliably receiving downlink transmissions from the macro base station 101. This degradation is most pronounced for path loss estimates that are relatively high and accordingly the parameter controller 207 can limit the maximum transmit power for a traffic channel to a lower level for a high path loss estimate than for a low path loss estimate.

As another example, the operating parameter may be a maximum total transmit power for the base station. The parameter controller 207 can limit the maximum total transmit power for the private cell 105 to a lower level for a high path loss estimate than for a low path loss estimate. It will be appreciated that adjustments or limitations to the maximum power may be carried out in conjunction with adjustments or limitations to the power of the common control channels and the power of each traffic channel.

As another example, the parameter controller 207 may be arranged to modify an uplink transmission parameter for user equipments being supported by the private base station 103.

Specifically, the transmit power of the first user equipment 107 when communicating with the private base station 103 results in interference at the macro base station 101. If this interference is sufficiently high, it may prevent the macro base station 101 from supporting macro user equipments 109. The lower the path loss, the more significant this degradation will be for a given transmit power level.

Also, the uplink transmissions from a macro user equipment 109 to the macro base station 101 will create interference at the receiver of the private base station 103. If this interference is too high, it can prevent the private base station 103 from effectively supporting a user equipment 107. As the transmit power from a macro user equipment 109 increases with the path loss, this degradation is more significant for higher path loss estimates resulting in the need for higher transmit powers for a user equipment 107 supported by the private base station 103.

Accordingly, the parameter controller 207 can control the maximum transmit power used by the user equipment 107 supported by the private base station 103 and can specifically increase this transmit power for an increasing path loss estimate. This transmit power adjustment may be limited to the situation where the path loss estimate meets a given criterion, such as a criterion that the path loss estimate is within a given interval.

As another example, the parameter controller 207 may be arranged to modify an uplink receiver characteristic of the private base station 103. Specifically, the parameter controller 207 can be arranged to set a receiver sensitivity of the uplink receiver of the private base station 103 in response to the path loss estimate.

For example, rather than directly adapting the transmit power of the user equipments supported by the private base station 103, the parameter controller 207 may decrease the sensitivity of the receiver of the private base station 103 for increasing path loss estimates. A decreased receiver sensitivity will result in the transmit powers for the user equipments 107 supported by the private base station 103 being increased by the power control loops thereby mitigating the effects of nearby macro user equipments 109. Again, the receiver sensitivity adjustment may be limited to the situation where the path loss estimate meets a given criterion, such as a criterion that the path loss estimate is within a given interval.

Specific detailed examples of the adjustments of the above mentioned parameters will be provided later.

In some embodiments, the parameter controller 207 may set a handover parameter for a handover of a user equipment of the user equipment subset in response to the path loss estimate. Specifically, the parameter controller may be arranged to change the criteria for determining whether a handover should be performed depending on the path loss estimate.

As a specific example, if the path loss estimate is below a given threshold, the handover criterion will be based on a signal to noise criterion whereas if the path loss estimate is above the threshold a received power criterion is used.

Thus, in the specific example, the private base station 103 can also control the handover operation from the private cell 105 to the macro cell. The handover operation is usually triggered by certain measurements made on the CPiCH. If the private cell 105 is close to the macro (corresponding to a low path loss estimate), the service area of the private cell 105 can be reduced, in order to reduce the possibility of interference to the macrocell receiver. This can be achieved if the handover is controlled by a signal to noise and interference (e.g. Ec/No) measure since the interference reflects the path loss to the macro such that the private cell 105 will be smaller the closer it is to the macro site thereby limiting the possibility of the uplink interfering with the macro receiver. If the cell is away from the macro site, the downlink interference is much lower and the service area of the private cell 105 could become large. However it will be advantageous to have a well defined maximum range for the service area. In this case the handover can advantageously be based on measurements of a measured received power of the cells such as a measurement of the received code power of the CPiCH (Received Signal Code Power RSCP).

In the following some specific detailed considerations of possible modifications of operating parameters as a function of the path loss estimate will be described. The following four scenarios are considered (corresponding to the typically most critical degradations):

| Scenario | Where | Impact on | Uplink/ Downlink |
|---|---|---|---|
| 1: Transmitting macro user equipment 109 de-senses the private base station 103 | Away from the macro base station 101 | Private base station 103 | Uplink |
| 2: Transmitting private user equipment 107 de-senses the macro base station 101 | Close to the macro base station 101 | Macro base station 101 | Uplink |
| 3: Transmitting private base station 103 creates macro coverage holes | Away from the macro base station 101 | Macro base station 101 | Downlink |
| 4: Transmitting macro base station 101 creates private base station 103 coverage restriction | Close to the macro base station 101 | Private base station 103 | Downlink |

Control of Maximum Transmit Power for Private User Equipment

In order to quantify the uplink effects, a simple analysis based on the propagation losses to the macro base station 101 and private base station 103 is performed.

Considering first the private base station 103 de-sensing, it is desired that the maximum user equipment power for a user equipment 107 being supported by the private base station 103 is set such that at its maximum path loss (from the private base station 103), it can achieve the desired signal to interference Ratio (SIR) target when a macro user equipment 109 is at its minimum path loss from the private base station 103. Thus:

$$P_{rap\text{-}ue,max} - L_{rap,max} \geq P_{mac\text{-}ue} - L_{rap,min} + SIR_{rap\text{-}ue}$$

where $P_{rap\text{-}ue,\ max}$ is the maximum transmit power of the private user equipment 107, $L_{rap,\ max}$ is the maximum path loss from the private user equipment 107 to the private base station 103, $P_{mac\text{-}ue}$ is the transmit power of the macro user equipment 109, $L_{rap,\ min}$ is the minimum path loss from the macro user equipment 109 to the private base station 103 and $SIR_{rap\text{-}ue}$ is the desired SIR for the private user equipment 107.

The transmitted power of the macro user equipment 109 is given as:

$$P_{mac\text{-}ue} = NF_{mac} + L_{mac,i} + SIR_{mac\text{-}ue}$$

where $NF_{mac}$ is the effective noise floor of the macro user equipment 109 (rather than just the thermal noise floor), $L_{mac,i}$ is the path loss from the macro user equipment 109 to the macro base station 101 and $SIR_{mac\text{-}ue}$ is the desired SIR for the macro user equipment 109.

This yields:

$$P_{rap\text{-}ue,max} \geq NF_{mac} + L_{mac,i} + (L_{rap,max} - L_{rap,min}) + SIR_{rap\text{-}ue} + SIR_{mac\text{-}ue}$$

This equation provides a lower limit or bound for the transmit power of the private user equipment 107 at the edge of the private cell 105 in order to overcome the de-sensing resulting from the macro user equipment 109.

Considering the macro base station 101 de-sensing, the highest power received at the macro base station 101 from the private user equipment 107 is:

$$P_{rx,NB} = P_{rap\text{-}ue,max} - L_{mac,o} \leq NF_{mac} + \Delta_{mac,prot}$$

where $L_{mac,o}$ is the path loss from the private user equipment 107 to the macro base station 101 and $\Delta_{mac,prot}$ is a margin ensuring that the signal is below the noise floor (it has a negative value).

It follows that:

$$P_{rap\text{-}ue,max} \leq NF_{mac} + L_{mac,o} + \Delta_{mac,prot}$$

This equation provides an upper limit or bound for the transmit power of the private user equipment 107 if the de-sensing of the macro base station 101 is to be avoided.

It should be noted that if Adjacent Channel Interference (ACI) is considered a term corresponding to the filtering suppression of ACI may be introduced to the above equations.

Figure 3:
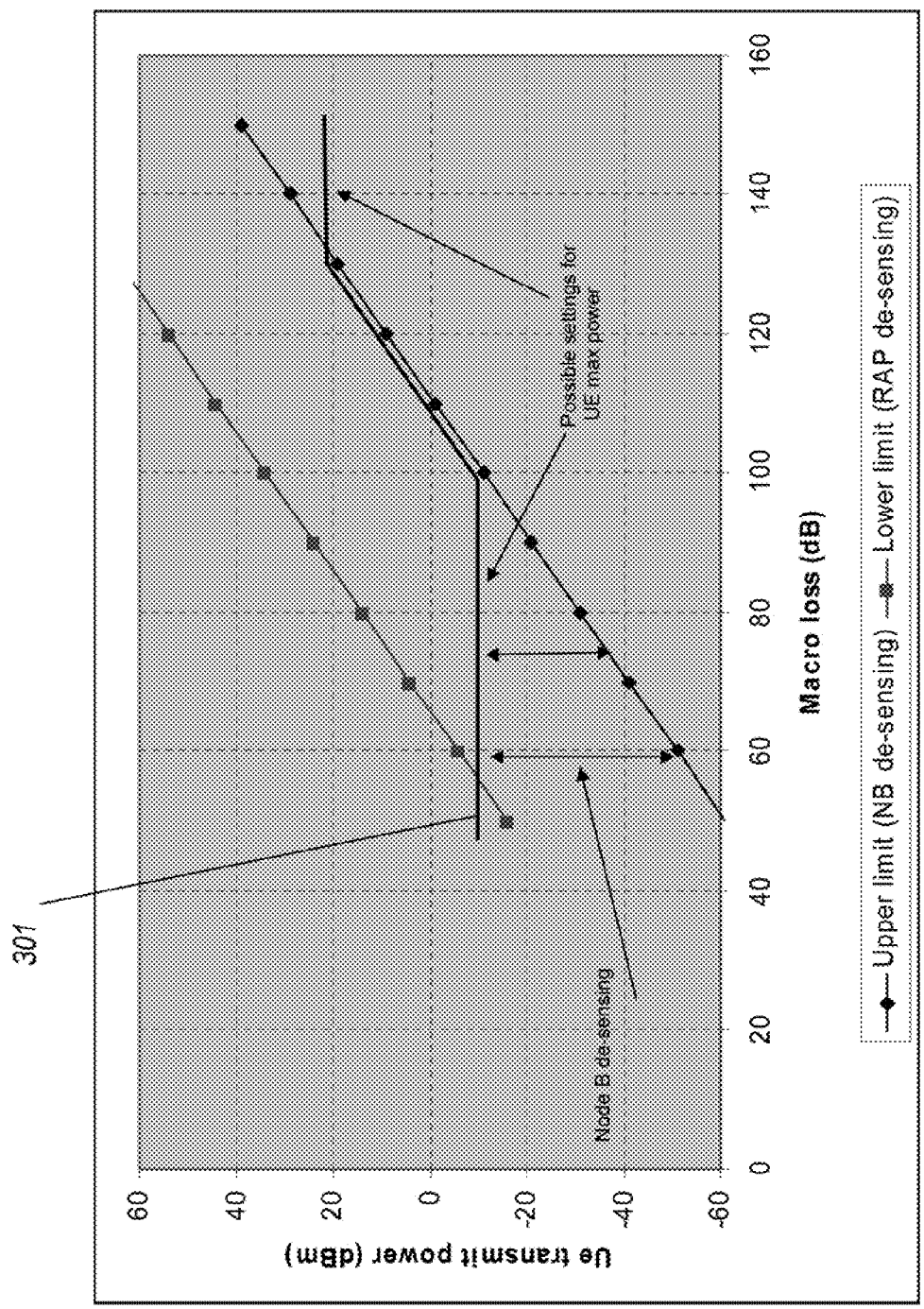
FIGS. 3 to 7 illustrate upper and lower bounds for operating parameters of a private base station in accordance with some embodiments of the invention.

FIG. 3 illustrates the two bounds for a co-channel interference scenario. The bounds are illustrated for the following parameter values:

$$NF_{mac} = -96 \text{ dBm}, [L_{rap,max} - L_{rap,min}] = 70 \text{ db},$$
$$SIR_{rap\text{-}ue} = -20 \text{ db}$$

$$SIR_{mac\text{-}ue} = -20 \text{ db}, \Delta_{mac,prot} = -15 \text{ dB}, L_{mac,i} = L_{mac,o}$$

As illustrated in FIG. 3, the upper bound is actually lower than the lower bound for these parameter values and accordingly there is no user equipment transmit power that will satisfy both constraints simultaneously.

Although it is not possible to satisfy both conditions simultaneously, it is possible to adjust the trade-off to improve performance.

For example, suppose that the curve 301 of FIG. 1 is used to set user equipment maximum power. Thus, up to a path loss estimate of 100 dB, the transmit power is set to a constant value in order to provide a minimum uplink range for the private base station 103. This creates a possibility of de-sensing of the macro base station 101 (the probability of this happening is proportional to the difference between the power curve and the bound for a given macro loss; so for macro losses below 100 dB, the probability of macro base station 101 de-sensing goes down with path loss whilst the probability of private base station 103 de-sensing goes up). Above a path loss estimate of 100 dB, the macro base station 101 de-sensing curve (i.e. the upper bound) is followed until the maximum user equipment power is reached (in the example this is 20 dBm).

Figure 4:
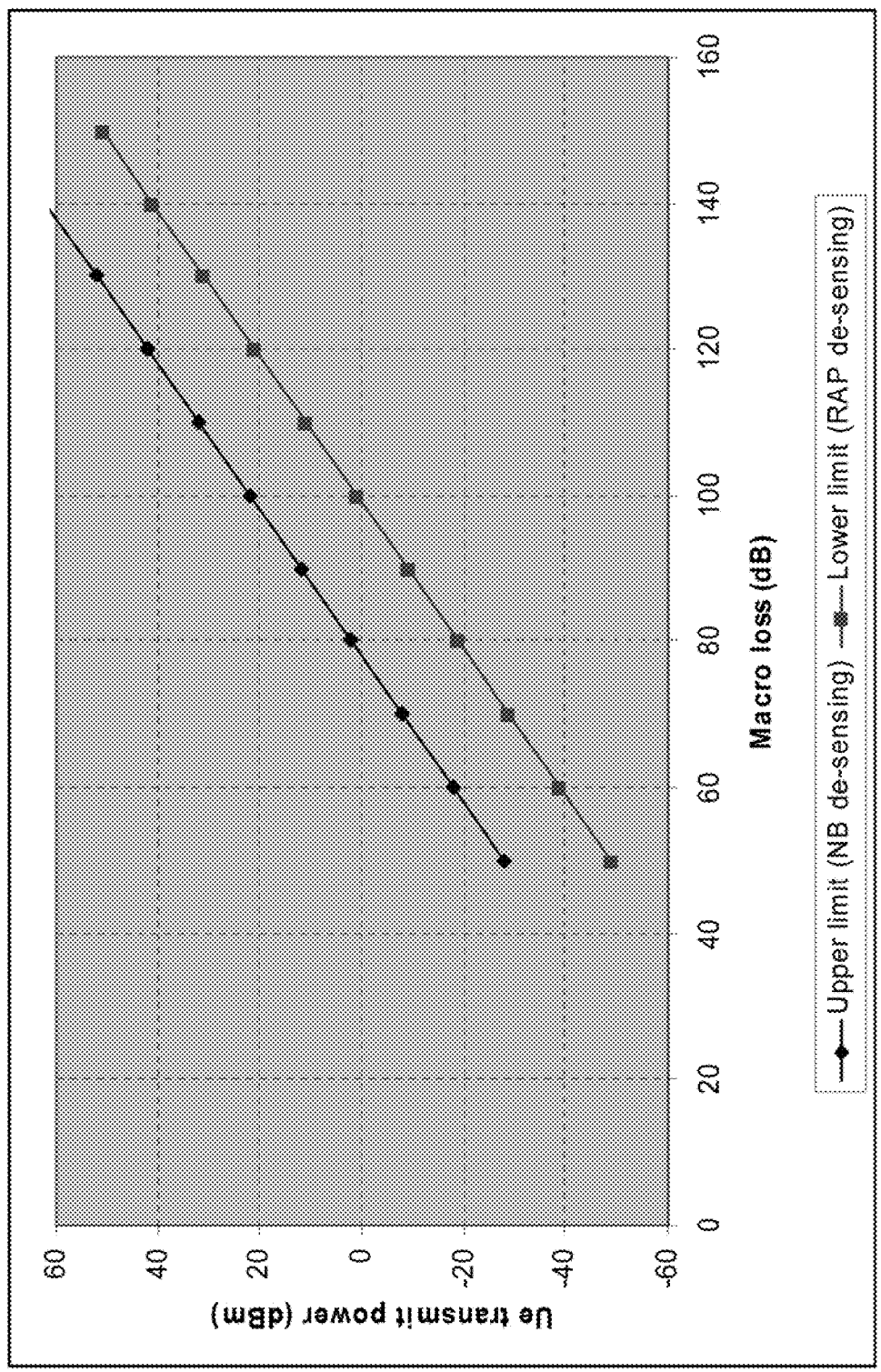

FIG. 4 illustrates the same upper and lower bounds for a scenario where the private base station 103 and the macro base station 101 use adjacent channels rather than co-channels. It is assumed that the adjacent channel leakage has a value of 33 dB corresponding to the requirement of the UMTS Technical Specifications.

As can be seen, for the adjacent channel scenario there is a solution space between the two bounds although this is relatively limited and typically may not be possible to meet due to other constraints. For example, the maximum transmit power may need to be −10 dBm or more in order to provide a sufficient coverage area for the private cell 105.

As an example of a power setting approach for the adjacent channel example, the maximum transmit power for the private user equipment 107 may be set to a minimum of −10 dBm for very low path loss estimates up to e.g. 70 dB (in this area, macro base station 101 de-sensing may occur albeit with a relatively low probability). Above this level, the power is allowed to increase whilst also keeping within the two bounds. Once the peak power (e.g. 20 dBm) of the private user equipment 107 is reached this power level is maintained. De-sensing of the private base station 103 (loss of coverage) may then occur once the macro path loss is above 120 dB.

Control of Receiver Sensitivity for the Private Base Station

In the previous example, control of the maximum power was used to balance the two de-sensing requirements. An alternative to this is to de-sensitise the private base station 103 in a variable manner. The main advantage of doing this is the receiver behaviour in the presence of a close interferer. If the maximum user equipment power is controlled the average user equipment powers are lower but the required dynamic range of the receiver will be higher since it will have to cope with broadband signal input levels going from −100 up to e.g. −70 dBm. If on the other hand the receiver sensitivity is controlled (based on the path loss estimate) the received levels would be indirectly controlled to rise further away from the macro base station 101 thereby leaving the dynamic range exactly the same everywhere. A disadvantage is that it increases the transmitted powers irrespective of whether there is an interfering user equipment nearby or not.

For the private base station 103 de-sensing case, the lower bound on the noise floor $NF_{rap}$ of the private base station 103 is given by:

$$NF_{rap} \geq NF_{mac} + (L_{mac,i} - L_{rap,min}) + SIR_{mac\text{-}ue} - \Delta_{rap,prot} - ACI$$

where $\Delta_{rap,prot}$ is a margin ensuring that the signal is below the noise floor (it is a negative value) and ACI is a term reflecting the adjacent interference.

For the macro base station 101 de-sensing scenario, an upper bound is found as:

$$NF_{rap} \leq NF_{mac} + (L_{mac,o} - L_{rap,max}) - SIR_{rap\text{-}ue} + \Delta_{mac,prot} + ACI$$

Figure 5:
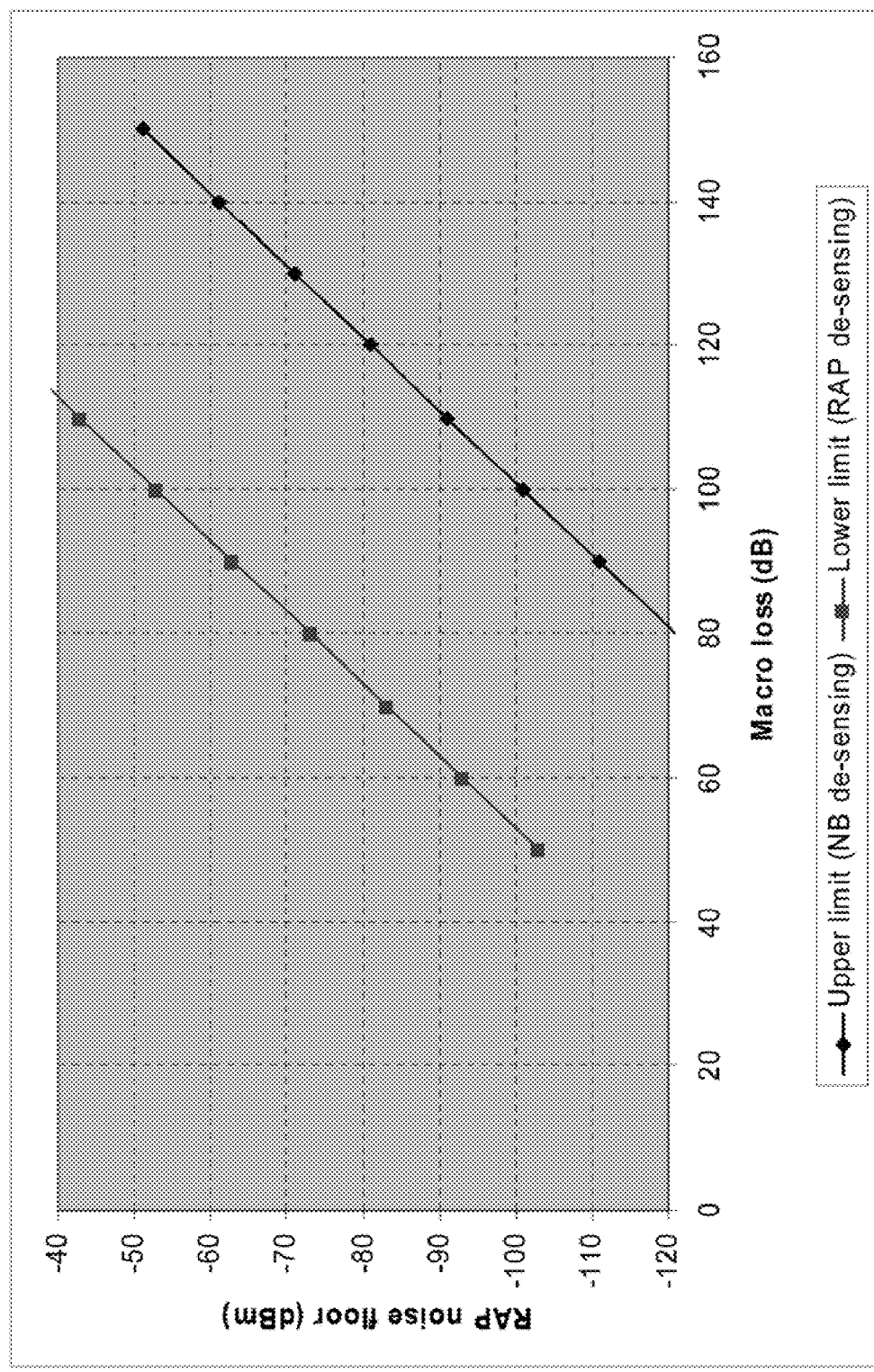
Figure 6:
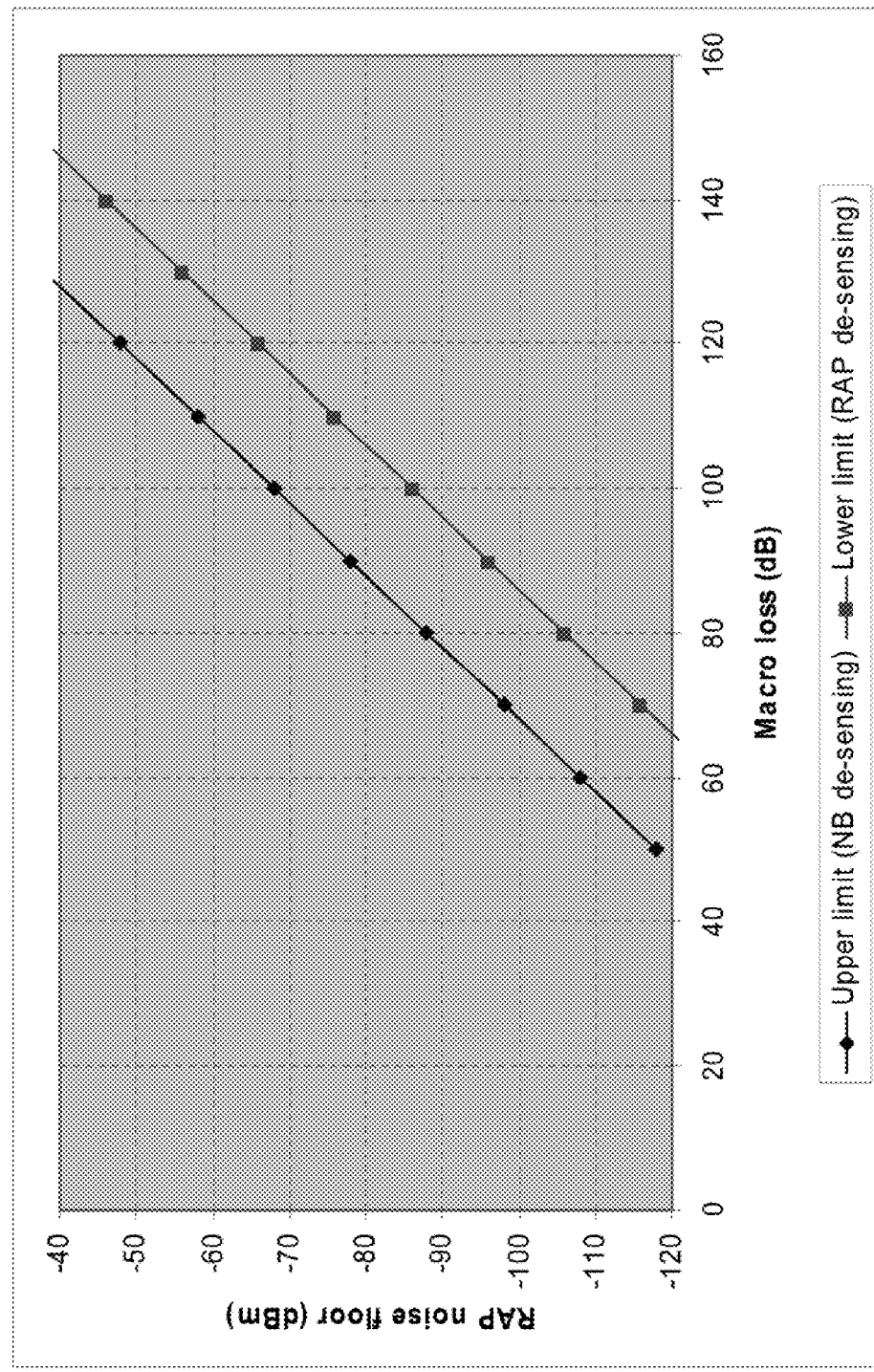

The respective bounds for the co-channel and adjacent channel cases are shown in FIGS. 5 and 6.

The same conclusions as for the transmit power regulation can be reached. Thus, for the co-channel case, there is no value that will satisfy both bounds simultaneously for any value of path loss. In this case, preferred values of receiver noise floor can only be obtained (without the risk of macro base station 101 de-sensing) when the path loss to the macro is at least 100 dB.

For the adjacent channel case, it is possible to satisfy both constraints except for physical constraints for the effective noise floor setting. Again, it appears that macro path losses above 70 dB can be accommodated without risk of macro base station 101 de-sensing.

Control of Maximum Transmit Power for the Private Base Station

A similar analysis may also be performed based on the downlink scenario.

First the coverage hole caused to the macro cell by the private base station 103 is considered. The condition here is that a minimum macro pilot signal to noise level is achieved at the macro user equipment 109 for the minimum coupling loss from the private base station 103.

This may result in the following bound:

$$P_{rap,tot} \leq P_{mac,pil} + (L_{rap,min} - L_{mac,i}) - \Gamma_{mac,min} + ACI$$

where $P_{rap,tot}$ and $P_{mac,pil}$ are respectively the total transmitted power of the private base station 103 and the transmitted macro pilot power from the macro base station 101; $\Gamma_{mac,min}$ is the minimum signal to noise ratio (Ec/No) required at the macro user equipment 109.

A second bound may be found by considering the minimum coverage area of a private cell when the private base station 103 is close to a macro base station 101 (since the macro base station 101 will create a high level of interference thereby reducing the area wherein the pilot signal from the private base station 103 can be decoded correctly). The bound is derived considering the pilot signal transmit power of the private base station 103. This may yield the following bound:

$$P_{rap,pil} \geq P_{mac,tot} + (L_{rap,max} - L_{mac,o}) \Gamma_{rap,min} - ACI$$

where $P_{mac,tot}$ and $P_{rap,pil}$ are respectively the total transmitted power of the macro base station 101 and the private base station 103 and $\Gamma_{rap,min}$ is the minimum Ec/No required at the private user equipment 107.

Figure 7:
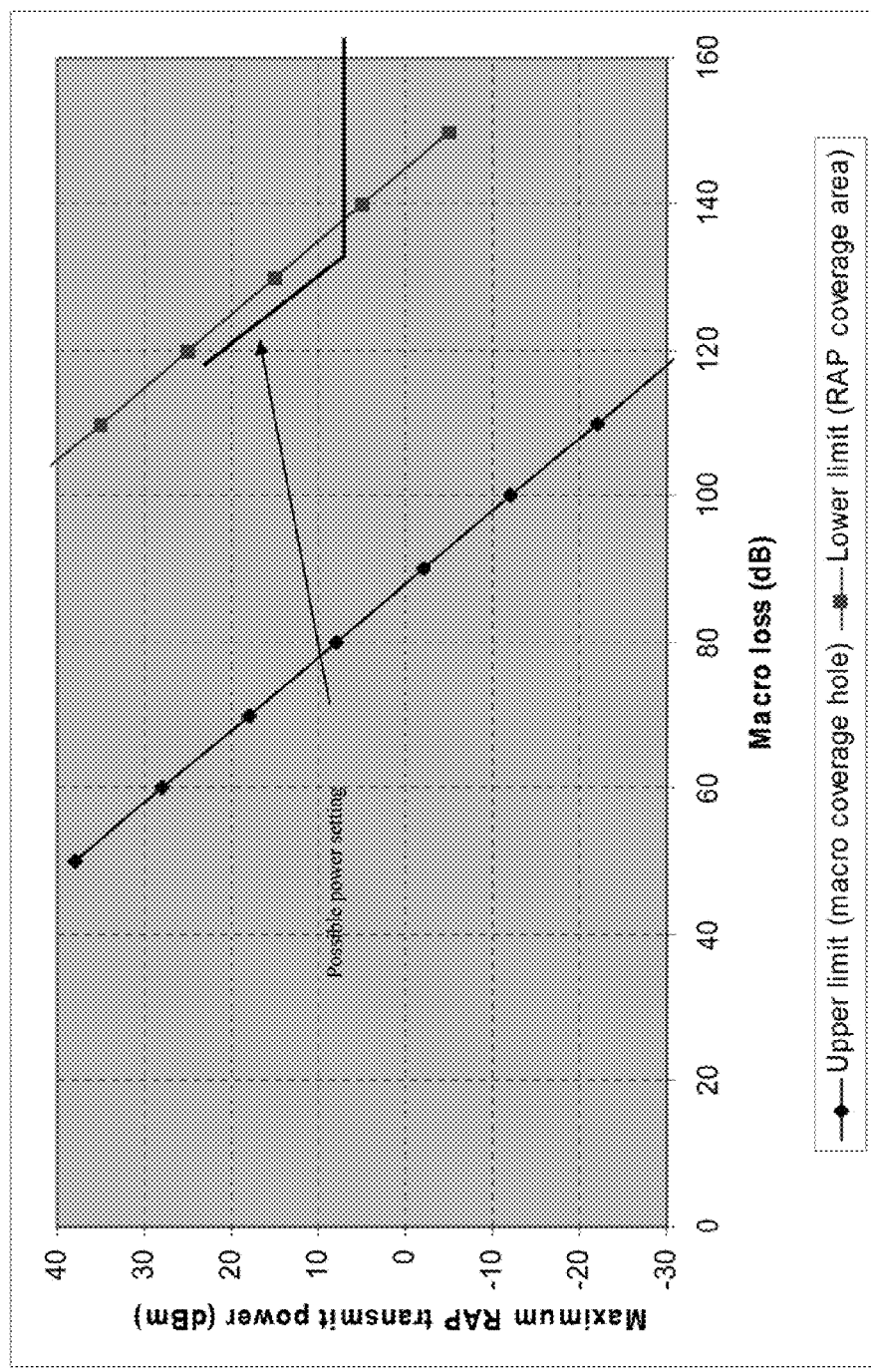

The respective bounds for the co-channel case are shown in FIG. 7.

The parameter values used are as follows:

$P_{mac,pil}$=30 dBm,$P_{mac,tot}$=40 dBm,$L_{rap,max}$=
110 dB,$L_{rap,min}$=40 dB,$L_{mac,i}$=$L_{mac,o}$
$EcNo_{mac,min}$=−18 dB,$EcNo_{rap,min}$=
−18 dB $P_{rap,pil}$=$P_{rap,tot}$−13 dB Examining the co-channel case, it can be seen that it is not possible to satisfy both constraints in the downlink either. Considering maximum powers between +5 and +20 dBm, it can be seen that macro coverage holes will be created almost everywhere in the cell. However at 10 dB macro path loss, the coverage hole is likely to be only a few metres (e.g. 4-5 m) around the private base station 103. On the other hand, the private base station 103 coverage area will be severely limited. For example, at 100 dB macro path loss, the range reduction could be as much as a factor of 10 (although this may be reduced by macro building penetration losses).

A possible strategy for mitigation is illustrated in FIG. 7. Specifically, below at least 100 dB path loss, and considering the likely maximum transmit power of 20 dBm, the private base station 103 coverage area is likely to be too small. Above 100 dB, it may be reasonable to set a transmit power such that there is a compromise between macro coverage holes and the private base station 103 coverage. Above 120 dB or so, it can be assumed that the macro coverage loss is no longer an issue, so the power can be maintained to ensure that it is sufficient for a reasonable range.

The previous analysis has considered the case of a single macrocell. However it will be clear that the same process can be repeated or modified to account for a plurality of surrounding macrocells, in order to provide constraints in a similar manner to that described here for the single macrocell case.

Figure 8:
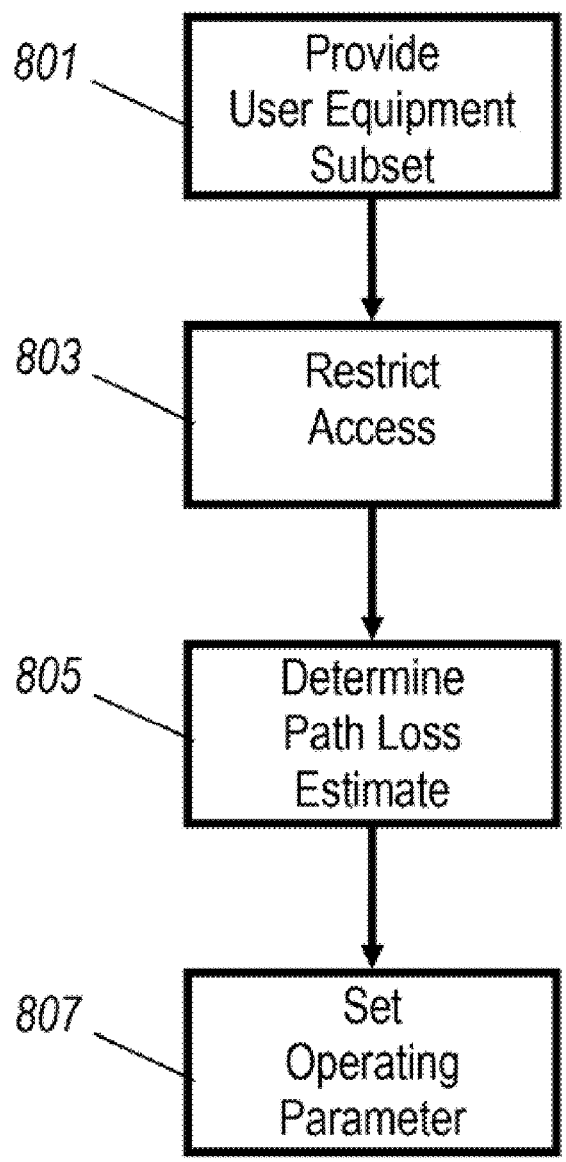
FIG. 8 illustrates a method of operation for a base station in accordance with some embodiments of the invention.

FIG. 8 illustrates an example of a method of operation of a base station for a cellular communication system.

The method initiates in step 801 wherein a user equipment subset identifying at least one user equipment associated with the base station is provided.

Step 801 is followed by step 803 wherein access to the base station is restricted to user equipments belonging to the user equipment subset.

Step 803 is followed by step 805 wherein a path loss estimate is determined from at least one neighbouring base station to a cell supported by the base station.

Step 805 is followed by step 807 wherein an operating parameter is set for the cell in response to the path loss estimate.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A restricted base station for a cellular communication system, the restricted base station comprising:
   means for providing a user equipment subset identifying at least one user equipment associated with the restricted base station;
   means for restricting access to the restricted base station to user equipments belonging to the user equipment subset;
   means for determining a path loss estimate indication from at least one neighbouring base station to a cell supported by the restricted base station; and
   operating means for setting a receiver sensitivity for the restricted base station in response to the path loss estimate indication;
   wherein the operating means is also for setting a broadcast channel transmit power for the restricted base station, and wherein the operating means is arranged to decrease the broadcast channel transmit power for an increasing path loss estimate.

2. The restricted base station of claim 1 wherein the operating means is also for setting a maximum traffic channel transmit power for the restricted base station.

3. The restricted base station of claim 1 wherein the operating means is arranged to decrease the receiver sensitivity for an increasing path loss estimate.

4. The restricted base station of claim 1 wherein the operating means is also for setting a maximum transmit power for a user equipment of the user equipment subset supported by the restricted base station, and wherein the operating means is arranged to increase the maximum transmit power for an increasing path loss estimate.

5. The restricted base station of claim 1 wherein the operating means is also for setting a handover parameter for a handover of a user equipment of the user equipment subset, and wherein the operating means is arranged to set a signal to noise handover criterion for the user equipment if the path loss estimate is below a threshold.

6. The restricted base station of claim 5 wherein the operating means is arranged to set a user equipment received power handover criterion for the user equipment if the path loss estimate is above a threshold.

7. The restricted base station of claim 1 wherein a frequency plan for the cellular communication system in a geographical area comprising the cell does not include the restricted base station.

8. The restricted base station of claim 1 wherein the at least one neighbouring base station is an unrestricted base station arranged to support any user equipment within a coverage area of the at least one neighbouring base station.

9. A method of operation for a restricted base station of a cellular communication system, the method comprising:

providing a user equipment subset identifying at least one user equipment associated with the restricted base station;

restricting access to the restricted base station to user equipments belonging to the user equipment subset;

determining a path loss estimate indication from at least one neighbouring base station to a cell supported by the restricted base station;

setting a receiver sensitivity for the restricted base station in response to the path loss estimate indication;

setting a broadcast channel transmit power for the restricted base station; and decreasing the broadcast channel transmit power for an increasing path loss estimate.

* * * * *